(12) United States Patent
Mevissen

(10) Patent No.: US 8,462,989 B2
(45) Date of Patent: Jun. 11, 2013

(54) SCALING AN IMAGE BASED ON A MOTION VECTOR

(75) Inventor: Perry Gerard Mevissen, Eindhoven (NL)

(73) Assignee: TP Vision Holding B.V., Eindhoven (NL)

( * ) Notice: Subject to any disclaimer, the term of this patent is extended or adjusted under 35 U.S.C. 154(b) by 1053 days.

(21) Appl. No.: 12/303,413

(22) PCT Filed: May 23, 2007

(86) PCT No.: PCT/IB2007/051940
§ 371 (c)(1),
(2), (4) Date: Dec. 4, 2008

(87) PCT Pub. No.: WO2007/141693
PCT Pub. Date: Dec. 13, 2007

(65) Prior Publication Data
US 2009/0190846 A1 Jul. 30, 2009

(30) Foreign Application Priority Data
Jun. 6, 2006 (EP) .................................... 06114985

(51) Int. Cl.
*G06K 9/00* (2006.01)
(52) U.S. Cl.
USPC ......................................... 382/107; 382/298
(58) Field of Classification Search
USPC ................... 382/107, 298; 348/445, 451, 452
See application file for complete search history.

(56) References Cited

U.S. PATENT DOCUMENTS

| 5,671,018 | A | 9/1997 | Ohara et al. ................... | 348/452 |
| 6,075,906 | A * | 6/2000 | Fenwick et al. ............... | 382/298 |
| 6,191,820 | B1 | 2/2001 | Kang et al. ..................... | 348/445 |
| 2002/0063807 | A1 | 5/2002 | Margulis ....................... | 348/745 |
| 2005/0248590 | A1 | 11/2005 | Tian et al. ..................... | 345/660 |

FOREIGN PATENT DOCUMENTS

| EP | 1643442 A1 | 4/2006 |
| JP | 4156088 A | 5/1992 |
| JP | 6350868 A | 12/1994 |
| JP | 2003204528 A | 7/2003 |
| WO | 0213507 A2 | 2/2002 |
| WO | 2005076599 A1 | 8/2005 |

OTHER PUBLICATIONS

Auty S J et al: "To and from the wide screen: aspect ratio conversion" Broadcasting Convention, 1995. IBC 95., International Amsterdam, Netherlands, London, UK. IEE, UK, Sep. 14-18, 1995, pp. 554-558, XP006528985 ISBN: 978-0-85296-644-0.

Lupatini G et al: "Scene break detection: a comparison" Reasearch Issues in Data Engineering, 1998. 'Continuous-Media Databases and Applications' Proceedings., Eighth International Workshop on Orlando, FL, Los Alamitos, CA, USA IEEE Comput. Soc, Feb. 23, 1998, pp. 34-41, XP010268563 ISBN: 978-0/8186-8389-3.

Shih-Chang Hsia, et al: "A Parallel Video Converter for Displaying 4 : 3 Images on 16 : 9 HDTV Receivers", IEEE Transactions on Circuits and Systems for Video Technology, vol. 6, No. 6, Dec. 1996, pp. 695-699.

Gerard De Haan: "Progress in Motion Estimation for Consumer Video Format Conversion", IEEE Transaction on Consumer Electronics, vol. 46, No. 3, Aug. 2000, pp. 449-459.

Gerard De Haan, et al: "An Efficient True-Motion Estimator Using Candidate Vectors from a Parametric Motion Model", IEEE Transactions on Circuits and Systems for Video Technology, vol. 8, No. 1, Feb. 1998, pp. 85-91, ISSN: 1051-8215.

* cited by examiner

*Primary Examiner* — Andrew W Johns
(74) *Attorney, Agent, or Firm* — Shimokaji & Assoc., PC

(57) ABSTRACT

Currently, various television standards use different aspect ratios. For example, a wide screen aspect ratio of 16:9 is gaining popularity over the existing TV broadcasts that use 4:3 aspect ratio. A method of scaling an image horizontally with a uniform or non-uniform scaling ratio is referred to as "panoramic scaling". A device 100 and method 800 of scaling an image 102 by means of a scaling function 121 that is generated on the basis of a motion vector 101 of at least a part of the image 102 is disclosed. The device 100 can be used in an image processing apparatus or in an image display apparatus for converting a first image with a first aspect ratio to a second image of a second aspect ratio. The disclosed device 100 is useful in reducing the visual distortion introduced by the panoramic scaling especially in case of moving objects in a scene.

22 Claims, 7 Drawing Sheets

SCALING AN IMAGE BASED ON A MOTION VECTOR

The present invention relates to a method of processing an image, more particularly to a method of scaling an image belonging to a video sequence of images.

The aspect ratio of an image is its displayed width divided by its height (usually expressed as "X:Y"). Currently, various television standards use different aspect ratios. A wide screen aspect ratio of 16:9 is gaining popularity over the existing TV broadcasts that use 4:3 aspect ratio. This results in requirements for aspect ratio conversion. Some common methods for aspect ratio conversion are, adding black bars at the sides, scaling the image only horizontally, and scaling the image horizontally and vertically. Scaling involves changing the resolution of an image frame of video data. A method of scaling an image horizontally with a non-uniform scaling function is referred to as "panoramic scaling". Non-uniform scaling causes the objects on the sides to be more distorted than those in the centre. Generally, panoramic scaling is acceptable for still images, but in case of a movement in the image, e.g. caused by camera panning, objects will appear with varying sizes because they are subjected to different scaling at different spatial locations. This causes a visible distortion of objects which can be quite annoying.

It is desirable to have an improved method of scaling an image belonging to a video sequence of images.

Accordingly, in an improved method of scaling an image belonging to a video sequence of images disclosed herein, the method comprises scaling the image based on a motion vector that describes the change of position of an object between a first position of the object in a first image and a second position of the object in a second image, said images belonging to the video sequence of images.

In a preferred embodiment the scaling the image comprises generating a scaling function based on the motion vector; and obtaining one or more pixels of a scaled image by applying the scaling function to one or more pixels of the image.

It is also desirable to have a device for improved scaling of an image belonging to a video sequence of images.

Accordingly, in a device for improved scaling of an image disclosed herein, the device comprises a first receiver capable of receiving a motion vector that describes the change of position of an object between a first position of the object in a first image and a second position of the object in a second image, said images belonging to the video sequence of images, a first generator capable of generating a scaling function based on the motion vector, and an image scaler capable of obtaining one or more pixels of a scaled image by applying the scaling function to one or more pixels of the image.

It is also desirable to have an image processing apparatus for improved scaling of an image wherein the scaling is based on a pre-defined aspect ratio.

Accordingly, in an image processing apparatus for improved scaling of an image disclosed herein, the image processing apparatus comprises a second receiver for receiving a sequence of images, a motion estimation unit capable of estimating a motion vector that describes the change of position of an object between a first position of the object in the first image and a second position of the object in a second image, said images belonging to the video sequence of images, and a device capable of scaling an image belonging to the video sequence of images wherein the scaling is based on a pre-defined aspect ratio.

It is also desirable to have an image display apparatus for improved scaling of an image and displaying the image.

Accordingly, in an image display apparatus disclosed herein, the apparatus comprises an image processing apparatus and a display device. The image processing apparatus is arranged for improved scaling of an image belonging to a video sequence of images and the display is arranged for displaying the scaled image.

It is also desirable to have a computer program and a computer program product for performing the steps of a method of scaling an image based on a motion vector.

Accordingly, in a computer program and a computer program product disclosed herein, the computer program and the program product comprise instructions for generating a scaling function based on the motion vector and instructions for obtaining one or more pixels of a scaled image by applying the scaling function to one or more pixels of the image belonging to the video sequence of images.

These and other aspects will be described in detail hereinafter, by way of examples, on the basis of the following embodiments, with reference to the accompanying drawings, wherein.

Figure 10:
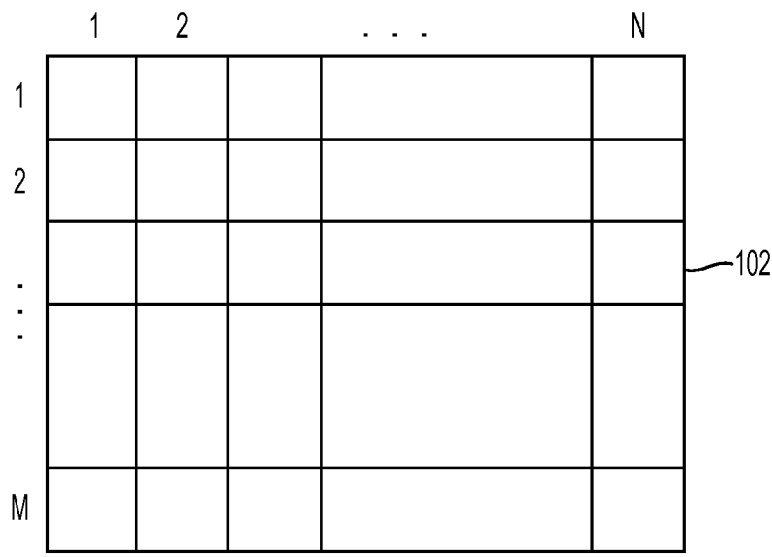

FIG. 10 schematically shows an image comprising M×N blocks of pixels.

Figure 11:
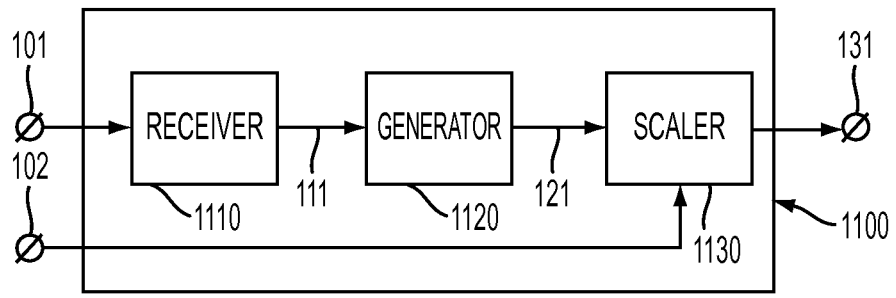

FIG. 11 schematically shows an embodiment of a device, for scaling an image.

Figure 12:
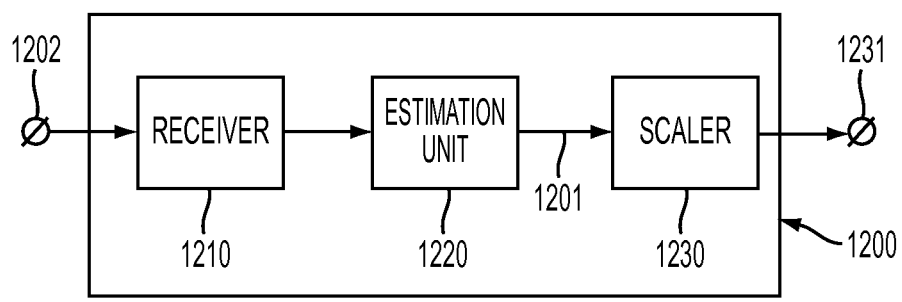

FIG. 12 schematically shows an embodiment of an image processing apparatus.

Figure 13:
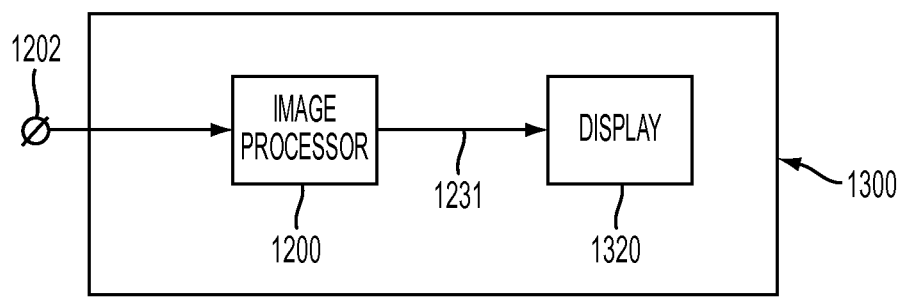

FIG. 13 schematically shows an embodiment of an image display apparatus.

Figure 14:
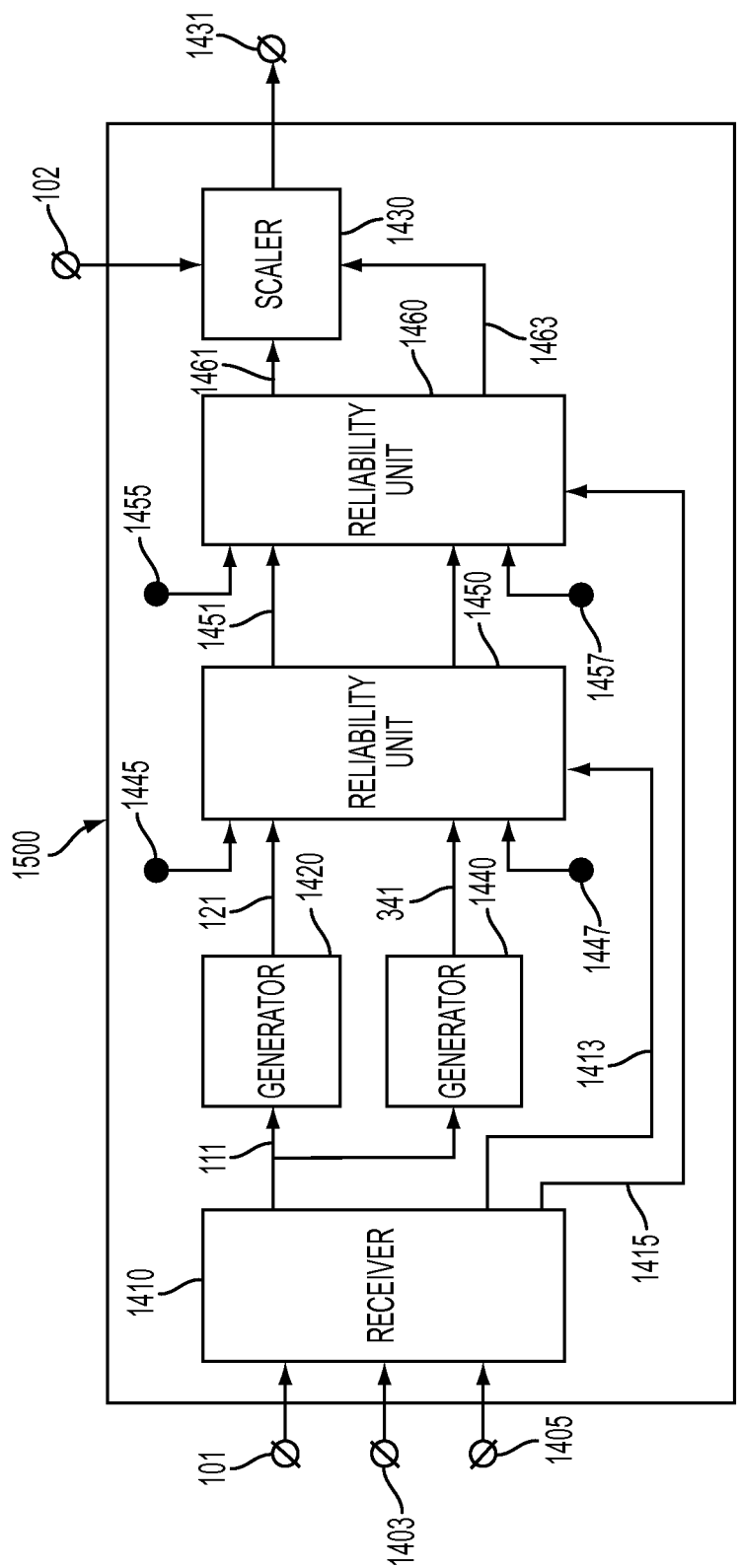

FIG. 14 schematically shows an embodiment of a reliable device for scaling an image.

Corresponding numerals used in the various figures represent corresponding elements in the figures.

Video data consists of sequences of images composed of pixels arranged in rows and columns. The images can be called frames. For example, video data may have 30 frames per second or 30 individual images that make up one second of video data. With the advent of digital television and streaming media, a number of new techniques have been developed to enable compatibility and interoperability of various media formats and display formats. Conversion of aspect ratio of an image by scaling an image is an important technique. For example, an image of aspect ratio 4:3, consisting of 640×480 pixels (NTSC resolution) can be scaled to an aspect ratio 16:9 consisting of 1920×1080 pixels (HDTV resolution). When an image is scaled, the value of each new pixel in the scaled image is based on one or more pixels in the original image. The computation of each new pixel can be formulated by means of a scaling function. A simplest scaling function is a linear equation. By applying a linear equation, the image is uniformly stretched in both the horizontal and vertical directions according to a constant horizontal scaling ratio and a vertical scaling ratio to obtain the required number of pixels. More often, the horizontal scaling ratio is not equal to the vertical scaling ratio e.g. when converting NTSC resolution to HDTV resolution. Scaling an image with unequal horizontal and vertical scaling ratios can cause visible distortion because objects in the scaled image appear elongated either in horizontal or vertical direction. A non-uniform panoramic scaling is generally used to reduce such distortion. According to this technique, row pixels in an image are scaled according to scaling ratios that vary depending upon the spatial locations. For example, a horizontal scaling ratio is increased gradually from the horizontal centre to either side of the panoramic image. However, this technique also causes visible distortion especially in a moving scene. When an object moves across a scene or a camera pans across the scene, the visual distortion becomes more pronounced as the object appears to constantly change its width. It is desirable to have a panoramic scaling with reduced visible distortion, especially in a moving scene.

Figure 1:
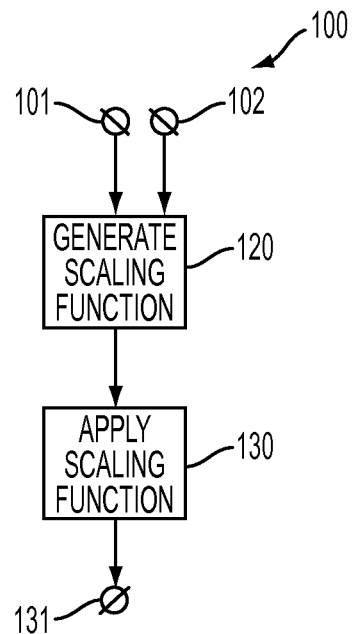
FIG. 1 illustrates an example of a method of scaling an image based on a motion vector.

FIG. 1 illustrates a possible implementation of the method 100 of scaling an image 102 based on a motion vector 101. A scaling function 121 is generated in step 120 and a scaled image 131 is obtained in step 130 by applying the scaling function 121 to one or more pixels of the image 102.

The motion vector 101 is typically obtained from a motion estimation method. A motion vector describes the change of position of an object between a first position of the object in a first image and a second position of the object in a second image, said images belonging to the video sequence of images. The first and the second images are displaced in time and are depicting a moving scene.

In order to reduce visible distortion, non-uniformity of scaling can be made dependent on the speed of movement of the object in the scene. From the motion vector, an adaptive scaling function that gets adapted to the motion in the image is obtained. In other words, a non-uniform scaling is applied to a static scene and a near-uniform scaling is applied to a fast moving scene and intermediate degrees of non-uniform scaling is applied to the image depending upon the magnitude of motion. As the speed of the object in a scene approaches a pre-determined speed, the non-uniform scaling tends to be a uniform scaling.

For each image of the sequence of images, a new scaling function based on the motion vector is computed. A different scaling ratio may be applied to each image. Within each image, the scaling ratio may be non-uniform depending upon the location. The non-linearity of the scaling function is adjusted such that a different scaling ratio is obtained at different spatial locations. For a motion vector of greater magnitude e.g. due to a fast movement of an object in a scene, a substantially linear scaling function is generated and applied so that a viewer does not perceive a strong "harmonica" effect. As a result of this, a substantially uniform scaling ratio is applied to pixels in the image. On the other hand, for a motion vector of lesser magnitude, e.g. obtained from a substantially static scene, a scaling function that generates a substantially non-uniform scaling ratio is generated. This is useful e.g. for a scene where some people are present in a part of the image and the requirement of scaling the surrounding areas is less critical. As a result, a substantially non-uniform scaling ratio is used for scaling an image of a substantially static scene. Therefore the scaling gets adapted according to the magnitude of the motion vector and applied to different spatial locations. The scaling gets distributed in space and time, thereby substantially reducing the visual distortion.

Useful motion vector estimators for the disclosed device include, without limitation, block matching and recursive type of motion vector estimators, as described by G. de Haan in "Progress in Motion Estimation for Consumer Video Format Conversion", IEEE Transactions on Consumer Electronics, vol. 46, no. 3, pp. 449-459, (August 2000). A skilled person can obtain a motion vector of at least a part of an image from a sequence of images by a number of well known techniques. In addition, useful motion estimators for the present device include a motion vector estimation unit as described above which can operate not only on blocks but regions of any kind of shape including blocks and pixels.

In another implementation of the method 100 a global motion vector 101 that describes global changes between the image 102 and a second image is used. A global motion vector can be determined from a motion model. Global motion estimation is a metric for the motion in the complete image, i.e. the average or dominant motion of large or multiple objects with more or less the same motion. The motion model can be applied in the detection of panning (i.e. translation) of objects or camera. The motion model is sometimes referred to as a "pan-zoom model". A scaling function could also be derived for different models e.g. rotating scenes in order to optimize the scaling requirements, thereby minimizing the visual artefacts. A scaling function based on a global motion vector can be advantageously used for generating a scaling function that can be advantageously used for scaling the entire image.

Techniques of estimating a global motion vector of an image are well known in the art. For example, in the article "An efficient true-motion estimator using candidate vectors from a panoramic motion model" by G. de Haan, et. al., in IEEE circuits and systems for video technology, vol 8, no. 1, pages 85-91, March 1998, a scheme of estimating a global motion vector from a motion model is described. Using such methods, a global motion vector can be generally estimated and used in one of the embodiments of the device.

In another implementation of the method 100, the scaling function 120 is generated by varying at least one parameter of the scaling function 120 based on one of the components of the motion vector 101. The scaling function 120 is designed to generate different scaling ratios at various spatial locations of the image 102. A spatially varying non-linear transformation function can be chosen as a scaling function. As an example, consider a quadratic function as shown in equation (1)

$$f(x)=ax^2+bx+c, \{a \neq 0\} \quad (1)$$

The quadratic function (1) is in the shape of a parabola and the vertex of the parabola occurs at the point on the graph with a x coordinate b/2a. The quadratic function is applied to a line of pixels for transformation such that the pixels at the centre are transformed using uniform scaling ratio and the pixels at the sides are transformed with increasingly non-uniform scaling ratios. As a result of this transformation, the objects at the centre will appear normal and the objects at the sides will appear elongated and deformed. Parabolas of different shapes can be obtained by varying the value of parameter a which, in turn can be controlled by a value derived from the motion vector. The derived value could be a horizontal component or a vertical component or a root mean squared value of the components of the motion vector. The derived value could be normalized between the range 0 to 1 for increased stability. The variation is controlled such that for a motion vector of greater magnitude, the parabola has lesser depth and a uniform scaling ratio is obtained. On the other hand, a motion vector of lesser magnitude results in a parabola with relatively greater depth. From the parabolas of different shapes, the non-uniformity of scaling ratio can be controlled.

In another implementation of the method 100, multi-modal functions could be used e.g. based on a combination of several functions. An example could be a combination of quadratic functions yielding superimposed parabolic shapes at different locations. For instance, a central region of an image possibly depicting some action, and peripheral regions of the image containing some background could be scaled with different shapes of parabolas obtained from different quadratic functions.

In a scaled image, the objects appear distorted in shape, typically when a horizontal scaling ratio is not equal to a vertical scaling ratio. Two possibilities exist: a first possibility is that the horizontal scaling ratio is greater than the vertical scaling ratio; and a second possibility is that the vertical scaling ratio is greater than the horizontal scaling ratio. In the first case, a horizontal scaling function may typically be generated based on the horizontal component of the motion vector and in the second case, a vertical scaling function may typically be generated based on the vertical component of the motion vector. The horizontal scaling function is applied on the row of pixels and the vertical scaling function is applied on the column of pixels. The vertical scaling function can be applied when the height of the displayed picture is larger than the width, e.g. displays in hand-held devices. Thus a vertical or a horizontal scaling function can be generated depending upon the application and applied selectively.

Performing a horizontal scaling using a horizontal scaling function according to one possible implementation of the method is now described in more detail. Consider an input image of aspect ratio 4:3 consisting of 640 pixels in each row and 480 pixels in each column. The input image is to be scaled to obtain an output image of 1920×1080 pixels conforming to an aspect ratio 16:9. In this example, horizontal scaling ratio is greater than the vertical scaling ratio. According to one implementation of the method, a non-uniform horizontal scaling function and a uniform vertical scaling function is applied to the input image. In such cases, K pixels in a particular portion of a line belonging to the input image are used to generate L pixels, K≠L, in a corresponding portion of a line belonging to the output image by applying the non-uniform horizontal scaling function. The L output pixels can be generated by one of the well known interpolation methods. The non-uniformity in turn is obtained from the non-linear function whose parameter is controlled by the horizontal component of the motion vector. Thus a method is provided to convert the aspect ratio of an image by scaling the image by applying the non-uniform scaling function that is motion dependent.

In another implementation of the method, the image 102 can be divided into, typically rectangular, blocks of pixels. A scaling function with an appropriate non-linearity can be applied to each part of the image containing the continuous motion, thereby resulting in lesser visual distortion.

Figure 2:
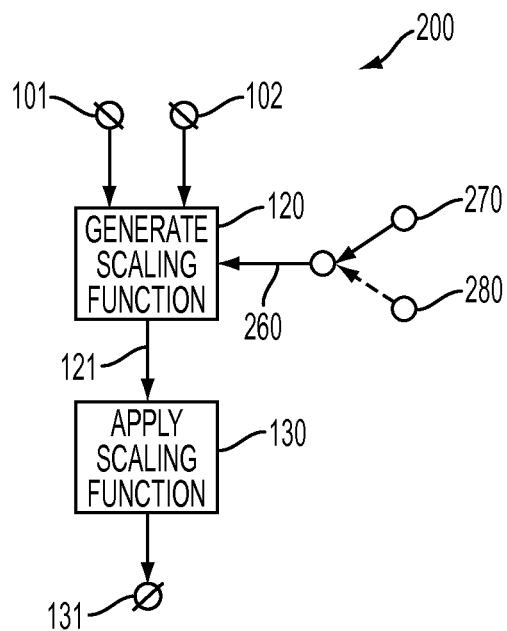
FIG. 2 illustrates an example of a method of generating a scaling function from a basis function.

FIG. 2 illustrates a possible implementation of the method 200 arranged to generate a scaling function from a basis function. A scaling function 121 is generated in step 120 and a scaled image 131 is obtained in step 130 by applying the scaling function 121 on one or more pixels of the image 102. A function 260 from the two possible groups of functions 270 and 280 can be selected and used in step 120. A set of non-linear functions 270 and a set of piece-wise linear functions 280 are provided. At least one parameter of the selected non-linear function can be varied according to a value derived from the motion vector 101. As an example, consider the function shown in equation (1). A set of non-linear functions can be generated by varying the parameter a. In addition, a substantially linear function $f(x)=bx+c$ can also be obtained by choosing a=0. A few examples of non-linear functions are, a quadratic function, an exponential function and a logarithmic function. Any one of these functions can be chosen as a basis function. It is often convenient to express a non-linear function as a piece-wise linear function for easier manipulation and computations in a digital computing device. For example, an input-output transformation in the form of a look-up-table is often used for representing a non-linear transformation. Piece-wise linear functions are also useful for expressing input-output values that may not be conforming to an equation.

Figure 3:
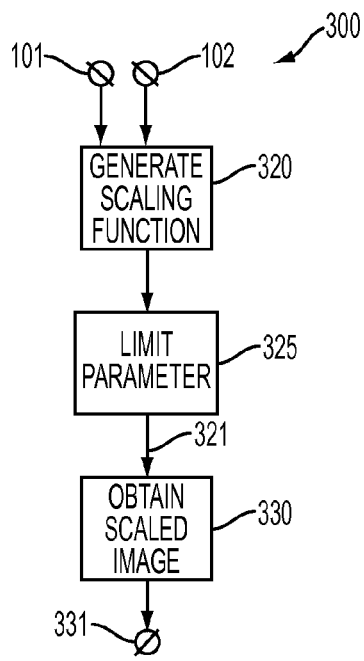
FIG. 3 illustrates an example of a method of generating a scaling function by limiting at least one parameter value.

FIG. 3 illustrates an example of a method 300 of generating a scaling function 321 by limiting at least one parameter value. A limiting step 325 is included in addition to the step 320 for generating a scaling function. The dynamic range of the motion vector 101 is generally much larger than the allowable parameter range of the scaling function 321. Hence it is advantageous to limit at least one parameter of the scaling function within a permissible range. The at least one parameter of the generated scaling function is substantially limited in step 325 within a pre-determined range of parameters, thereby increasing the overall stability of the device 300. Limiting the parameters is advantageous as the arrangement increases the reliability by avoiding a saturation or a runaway condition in the step 330 for obtaining a scaled image. The range of the parameters of the scaling function 321 can be a design parameter or it can be decided in accordance with the allowable input range in the step 330 of obtaining the scaled image 331.

Figure 4:
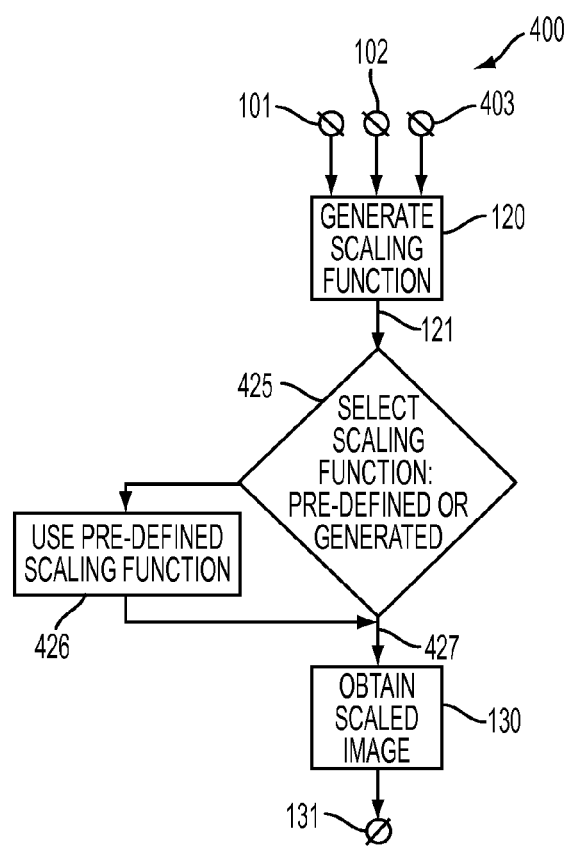
FIG. 4 illustrates an example of a method of selecting a scaling function based on a reliability value.

FIG. 4 illustrates an example of a method 400 of selecting a scaling function based on a reliability value 403. Every motion vector 101 may be optionally associated with a reliability value 403. The method 400 comprises a selection step 425 for selecting either the scaling function 121 generated by step 120 or a pre-defined scaling function 426 based on the reliability value 403. An example of a pre-defined scaling function is a simple linear function. In a pan-zoom model described in the description of FIG. 1, a reliability value of the estimated motion vector can be made available. The reliability value may be low when the scene has multiple objects moving in different directions e.g. a chaotic scene. The motion vector based scaling is applied only when the estimated motion vector is reliable, as indicated by the reliability value. The selected scaling function 427 is used in the step 130 for obtaining a scaled image 131.

Figure 5:
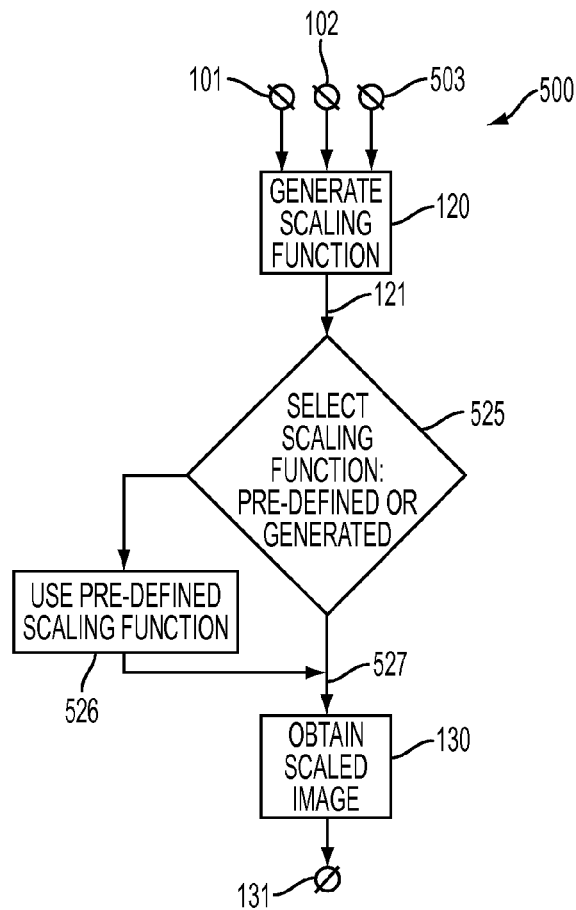
FIG. 5 illustrates an example of a method of selecting a scaling function based on a scene change signal.

FIG. 5 illustrates an example of a method 500 of selecting a scaling function based on a scene change signal 503. The scene change signal 503 can be optionally generated by a method or a device used for estimating the motion vector 101. Several other methods of obtaining a scene change signal are well known in the art. The method 500 comprises a step 525 of selecting the scaling function 121 generated by step 120 or a pre-defined scaling function 526 based on the scene change signal 503. As long as there is no scene change, the generated scaling function 525 is applied in the step 130 of generating the scaled image. When there is a scene change, continued application of the scaling function 121 of a previous scene can cause visible distortion. A pre-determined scaling function 526 that can reset the parameters of the scaling function can be advantageously applied during an interim period when a new sequence of images gets stabilized. For example, a quadratic function with a pre-determined set of parameters can be used for a new scene. The selected scaling function 527 is applied in step 130 to generate the scaled image 131. Due to this arrangement, visual artefacts due to a scene change are relatively reduced and the robustness of the method 500 is increased.

Figure 6:
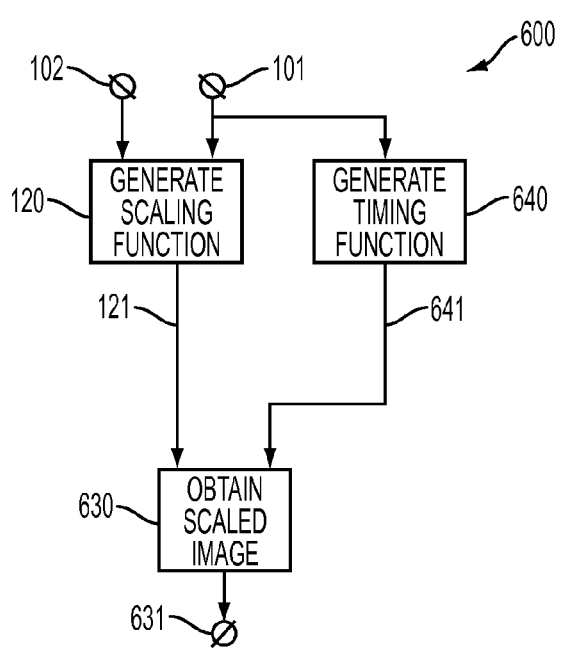
FIG. 6 illustrates an example of a method of generating a timing function.

FIG. 6 illustrates an example of a method 600 of generating a timing function 641. In addition to the step 120 for generating a scaling function 121, the method comprises a step 640 for generating a timing function from the motion vector 101. The timing function 641 is used in step 630 for obtaining a scaled image 631. The timing function 641 decides the rate at which the scaling function 121 is to be applied on the image 102. Changing the scaling ratio abruptly can cause jerks and visible artefacts in the output image 331. While the scaling function 121 controls the quantity of change in the scaling ratio, the timing function 641 controls the rate at which the quantity of change is to be applied on the sequence of images, one image frame at a time. Thus the scaling is controlled in an additional dimension i.e. time. Fast and frequent changes in motion vector magnitude may result in corresponding changes in the scaling function 121, which when applied instantaneously, may cause undesirable jerks and distortions in the output image 631. The timing function 641 is useful in achieving a gradual change in the scaling function 121. For example, a linear timing function for retarded application of the scaling function can be chosen. As a result, the objects in the output image 631 appear to go through a smoother transition. The changes in the scaling ratio get dispersed in space-time resulting in lesser visual distortion.

Figure 7:
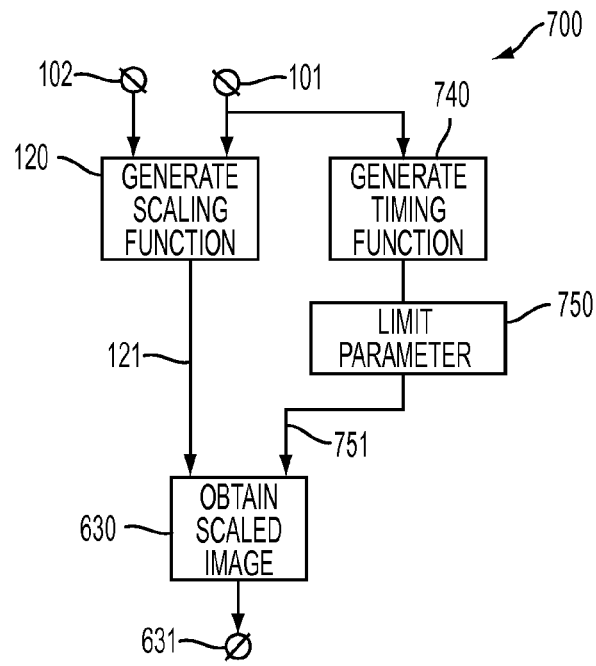
FIG. 7 illustrates an example of a method of generating a timing function by limiting at least one parameter value.

FIG. 7 illustrates an example of a method 700 of generating a timing function 751 by limiting at least one parameter value. A limiting step 750 is included in the timing function generating step 740. The dynamic range of the motion vector 101 is generally much larger than the pre-defined parameter range of the timing function. Hence it is advantageous to limit the values generated by the timing function within a permissible range. The parameter of the generated timing function 751 is substantially limited within a pre-determined range, thereby increasing the stability of the overall method 700. Limiting the parameters of the timing function is advantageous as the arrangement increases the reliability by avoiding a saturation or a runaway condition in the step 700. The pre-determined range for the parameters of the timing function can be a design feature. The range can be decided by the allowable inputs in step 630 of scaling the image 102.

Figure 8:
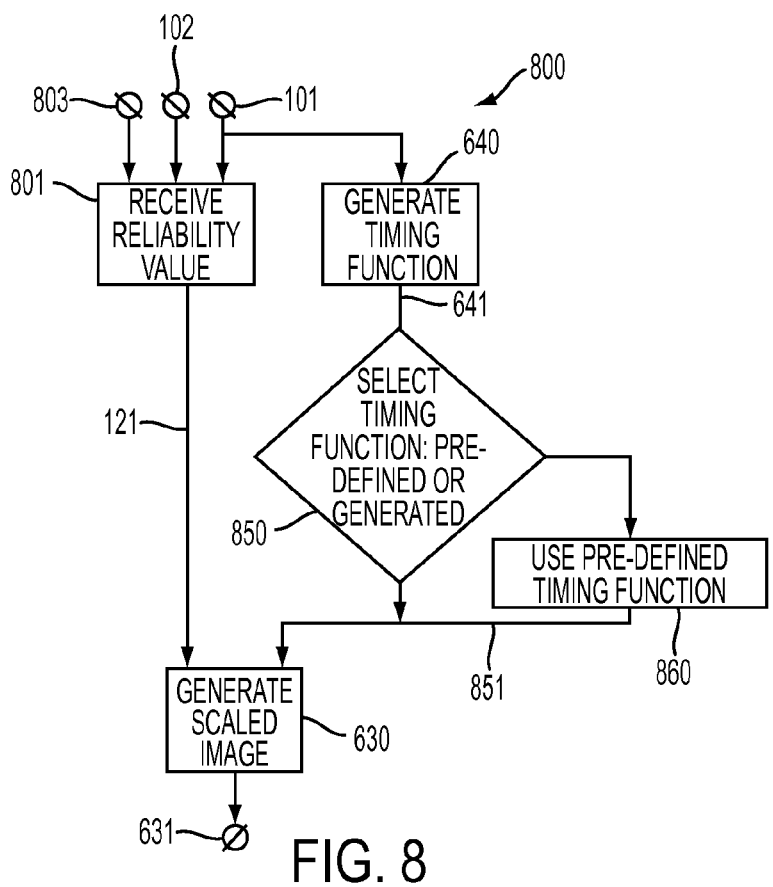
FIG. 8 illustrates an example of a method of selecting a timing function based on a reliability value.

FIG. 8 illustrates an example of a method 800 of selecting a timing function based on a reliability value 803. Every motion vector 101 may in step 801 be optionally received with a reliability value 803. The method 800 comprises a selection step 850 for selecting either the timing function 641 generated by step 640 or a pre-defined timing function 860, based on the reliability value 803. The generated timing function 641 is used in the step 630 of generating the scaled image 631 only when the reliability value 803 exceeds a pre-defined threshold value. When the estimated motion vector 803 is found to be unreliable, a pre-defined timing function 860 e.g. a constant time value or a linear time function is selected and the selected timing function 851 is used in the scaling of the image 102.

Figure 9:
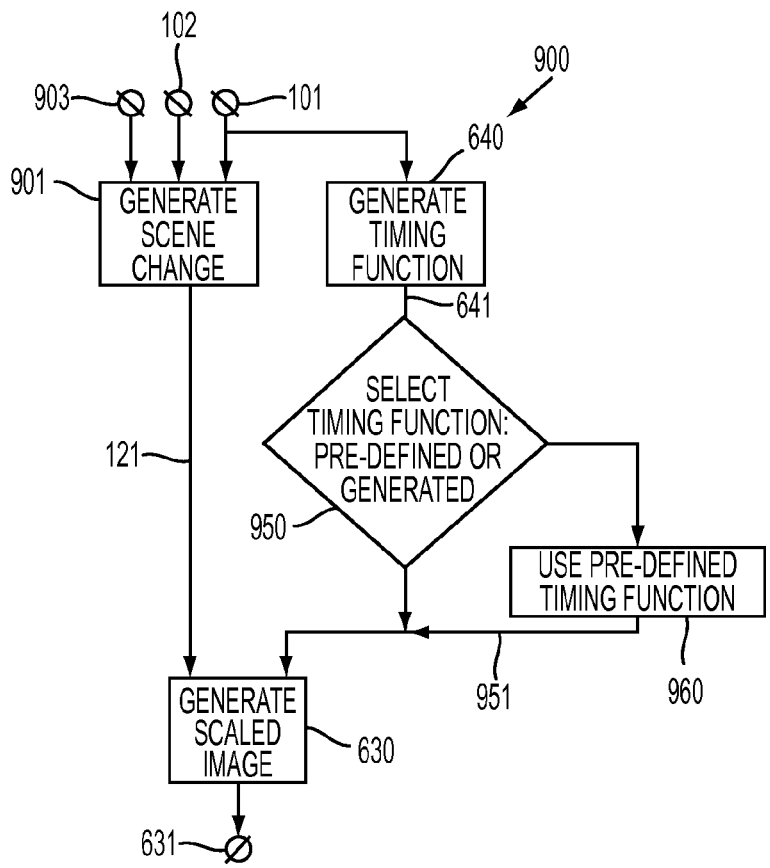
FIG. 9 illustrates an example of a method of selecting a timing function based on a scene change signal.

FIG. 9 illustrates an example of a method 900 of selecting a timing function based on a scene change signal 903. The scene change signal 903 can be optionally generated in step 901 by a method or a device used for estimating the motion vector 101. Several other methods of obtaining a scene change signal are well known in the art. The method 900 comprises a step 950 of selecting the timing function 641 generated by step 640 or a pre-defined timing function 960 based on the scene change signal 903. As long as there is no scene change, the generated timing function 641 is used in the step 630 of generating the scaled image 631. As explained earlier, the selected timing function 951 is useful in applying the scaling function 121 at a desired rate. When there is a scene change, continued application of the scaling function of a previous scene can cause visible distortion. A pre-determined timing function 960 can be applied in the interim period until a new sequence of images gets stabilized. Due to this arrangement, disturbances due to a scene change are relatively reduced and the robustness of the method 900 is increased.

FIG. 10 schematically shows an image 102 comprising M×N blocks of pixels. In the image 102, each block can consists of m×n pixels. There are M rows and N columns of blocks in the image. In each block there are m rows and n columns of pixels. In general m≠n and M≠N, but the special cases of M=N and m=n are not excluded in the provided device. In well known video compression schemes e.g. MPEG, a motion vector is estimated for each block and assigned to each pixel belonging to the block. A global motion vector can be determined from a motion model using the M×N blocks. The global motion vector can be used for generating a scaling function for the image. In another implementation M or N motion vectors corresponding to M×1 blocks or 1×N blocks respectively can be estimated and used for generating M or N scaling functions respectively. The M scaling functions can be applied for scaling pixels belonging to respective M horizontal strips of width m pixels each. Similarly, the N scaling functions can be applied for scaling of pixels belonging to the respective N strips of width n pixels each. Thus, each strip or part of the image can be scaled with a different scaling function thereby controlling the scaling ratio independently for each part of the image. This scheme is especially useful in applications wherein one or more horizontal strips may be containing a continuous motion e.g. a ticker tape.

FIG. 11 schematically shows a device 1100 for scaling an image 102 belonging to a sequence of images. The scaling is based on a motion vector 101 that describes the change of position of an object in the image 102. Alternately, the motion vector 101 may describe the changes of a background region. The device 1100 comprises a first receiver 1110 for receiving the motion vector 101, a first generator 1120 for generating a scaling function 121 and an image scaler 1130 for obtaining a scaled image 131 by applying the scaling function 121 on one or more pixels in the image 102.

When the device 1100 is in operation, the first receiver 1110 receives a motion vector 101, typically from a motion estimation unit. The motion vector 101 describes a motion of an object or describes a change of at least a part of a first image and a corresponding part of a second image, the first and second images are displaced in time and are belonging to an image sequence depicting a moving scene. A derived value 111 of the motion vector 101 is coupled to the first generator 1120. The derived value 111 may be one of the components such as vertical or horizontal component of the motion vector or a resultant magnitude derived from the root mean squared values of the motion vector. The derived value 111 can be a normalized value within a certain range e.g. 0 to 1. The first generator 1120 generates a scaling function 121 based on the derived value 111. The image scaler 1130 applies the scaling function 121 on the one or more pixels in the image 102. The image scaler 1130 is capable of applying the scaling function 121 to the one or more pixels belonging to the at least a part of the image 102 or to the entire image 102. The image scaler for example, is capable of scaling only a sub-region of a picture containing a ticker tape text, leaving the rest of the image unaffected. The image scaler can be equipped to fill the unaffected parts of the image with black bars or a 'filler' obtained from a temporally adjacent image.

FIG. 12 schematically shows an embodiment of an image processing apparatus 1200. The apparatus 1200 comprises a second receiver 1210, a motion vector estimation unit 1220, and an image scaler 1230. In operation, the second receiver 1210 receives an image 1201 belonging to a sequence of images. The motion vector estimation unit 1220 estimates a motion vector 1221 of at least a part of the image 1201. The motion vector estimation unit 1220 uses one of the known methods in the art to estimate a motion vector 1221 of at least a part of the image. In one embodiment, the motion vector estimation unit 1220 is arranged to estimate a global motion vector of the image 1201. Generally, for the estimation of a motion vector, two images that are displaced in time, and belonging to a sequence of images are used. In one embodiment, the motion vector unit 1220 may use three consecutive images belonging to an image sequence. The motion vector estimation unit 1220 optionally comprises an additional motion model unit for estimating a global motion vector that describes global changes between an image and a preceding image or an image and a succeeding image. An adaptive scaling function and a corresponding scaling ratio is provided for aspect ratio conversion of an image. The image processing apparatus might be e.g. a PC, a set top box, a VCR/VCP (Video Cassette Recorder/Player), satellite tuner, or a DVD (digital Versatile Disk) player/recorder or a professional video processing station in a studio or a conversion device in a link station of a network operator.

FIG. 13 schematically shows an embodiment of an image display apparatus 1300. The image display apparatus 1300 comprises an image processing apparatus 1200 and a display device 1320. The image display apparatus is capable of receiving video sequence of images 1202 and displaying them. The display apparatus 1320 may have a wide screen aspect ratio e.g. 16:9. In general, any aspect ratio for a wide screen display apparatus can be obtained from the disclosed image processing apparatus 1200. In some displays of handheld devices such as satellite navigational systems and mobile phones, the displayed height of an image may be greater than its width. The display apparatus 1300 is also useful for displaying images of aspect ratios lesser than or greater than 4:3. The display apparatus 1300 might be a wide screen TV with a display width greater than the height, a PC with wide screen display, a media centre, or a hand-held device with a display height greater than the width.

FIG. 14 schematically shows an embodiment of a device 1400 for scaling an image based on a motion vector. The device 1400 comprises a first receiver 1410, a first generator 1420, a second generator 1440, a first reliability unit 1450, a second reliability unit 1460 and an image scaler 1430. In operation, the first receiver 1410 receives a motion vector 101 of at least a part of an image 102, a reliability value 1403 associated with the motion vector 101 and a scene change value 1405. The reliability value 1403 and the scene change value 1405 can be optionally generated by a motion vector estimation unit. Techniques of obtaining a scene change value from a sequence of images either independently or from a motion vector estimation unit are well known in the art. The inputs 101, 1403 and 1405 can be independently handled by the first receiver 1410. The outputs of the first receiver 1410 comprises a derived value 111 of the motion vector 101, a reliability signal 1413 derived from the reliability value 1403 and a scene change signal 1415 derived from the scene change value 1405. In one embodiment of the device 1400, pre-defined threshold values for obtaining the reliability signal and the scene change signal can be applied in the first receiver 1410. In another embodiment of the device 1400, the pre-defined threshold values can be applied in the respective reliability units 1450 and 1460.

In operation, the first reliability unit 1450 selects one of the two scaling functions namely a first pre-determined scaling function 1445 or the generated scaling function 121, the selection being effected by the reliability signal 1413. If the reliability value 1403 of the motion vector exceeds the pre-defined threshold value, the generated scaling function 121 is used by the image scaling unit 1430. The first reliability unit 1450 is also arranged to switch a generated timing function 341 or a first pre-determined timing function 1447 in a similar manner. In one embodiment, the first pre-determined scaling function 1445 can be the function that is applied at the instant when the reliability value 1403 is less than the pre-defined threshold value. Similarly, the first pre-determined timing function 1447 can be the function that is applied at the instant when the reliability value 1403 becomes less than the pre-defined threshold value.

A scene change signal 1415 is generated in the receiver 1410 when the scene change value 1405 exceeds a pre-defined threshold value. It is possible to receive a scene change detection signal 1415 directly from an external source. The function of the second reliability unit 1460 is to select either a second pre-determined scaling function 1455 or the scaling function 1451 available at the output of the first reliability unit 1450, the selection being controlled by the scene change detection signal 1415. As long as there is no scene change, the scaling function 1451 and the timing function 1453 available at the output of the first reliability unit 1450 is coupled to the image scaling unit 1430. Thus a selected scaling function 1461 and a selected timing function 1463 are made available at the image scaler 1430. When there is a scene change signal, the scaling function and the timing function meant for the previous scene can cause visual distortion. Therefore the second reliability unit is arranged to switch to a second pre-determined scaling function 1455 and a second pre-determined timing function 1457. In one embodiment of the device 1400, the second pre-determined scaling function 1455 and the second pre-determined timing function 1457 are reset to initial settings. Due to this arrangement, disturbances due to a scene change is relatively reduced and the robustness of the device 1400 is increased.

The device 1100 for motion vector based scaling of one or more pixels of an image and the image processing apparatus 1200 and the image display apparatus 1300 may be implemented by means of digital hardware or by means of software which is executed by a digital signal processor or by a general purpose computer.

Apart from the simple embodiments which only identify a global motion such as a global camera pan, motion of separate objects, typically the foreground objects may be analyzed and the scaling can take these objects into account. For example, a single scaling function can be fine tuned in order to follow the movement of a single person or a foreground object. A foreground object could be easily segmented on the basis of motion vectors alone. However, further analysis of the foreground object e.g. texture analysis or face detection, could be performed to classify the objects and to choose an appropriate scaling function.

In a shot, optimal scaling functions could be selected and modified, taking into account all relevant motion in the shot. An optimal balance may hence be made by taking into account various severity conditions of deformations of moving people and deformation of backgrounds. For example, some deformation may be less objectionable if the artefacts appear in the periphery of human vision, and the deformation may be more objectionable for larger panning speeds. Appropriate background scaling functions can be selected such as a second quadratic function partially supplemented with suitable extrapolation data from the surrounding pictures.

Although motion vectors can be determined on the fly, motion vectors may already be available embedded in the image sequence, or alternatively as metadata complementing the image sequence. By calculating motion vectors once for a sequence in an off-line scenario processing requirements are reduced. In addition a high quality algorithm may be used that may employ advanced segmentation techniques in order to improve the quality of the resulting motion vectors.

The motion vector information may also comprise additional coefficients that were determined off-line that improve the quality of the motion vector generations. This information may comprise e.g. shot boundaries, the type of shot, including parameters that e.g. describe a pan, or zoom sequence.

Alternatively the metadata may comprise the actual coefficients used to generate a scaling function itself. An artist specialized in content creation may specify the coefficients or other data of at least one scaling function into a reserved data part of a television signal (e.g. as supplemental enhancement information of a compressed television signal, or in the teletext lines, etc.), so that the display will create the optimal effect, and the artist may even do so for a number of displays (e.g. small to large projection), the display identifying which scaling type is the most appropriate.

It is also possible to use a concatenation of several scaling functions (e.g. parabolas), e.g. a first parabola around the central action in the scene, and a second parabola for background regions near the image border. Alternatively such scaling functions may be implemented as piece wise linear scaling functions.

It is also possible to apply several scaling functions on parts of the image, e.g. subtext regions, leaving the remainder of the image unscaled, with an additional picture in the unaffected part such as a clock, a logo, commercial information, scroll text, or black bars.

The scope of the invention is not limited to the embodiments explicitly disclosed. The invention is embodied in each new characteristic and each combination of characteristics. Any reference signs do not limit the scope of the claims. The word "comprising" does not exclude the presence of other elements or steps than those listed in a claim. Use of the word "a", or "an" preceding an element does not exclude the presence of a plurality of such elements. All device units and method steps described can be combined and realized as one or several hardware units or software implementations, and as such distributed over networks, ordered, etc.

The invention claimed is:

1. A method of processing an image to be scaled belonging to a video sequence of images, comprising scaling the image to be scaled based on a motion vector that describes the change of position of an object between a first position of the object in a first image and a second position of the object in a second image, said first and second images belonging to the video sequence of images.

2. The method of claim 1, wherein scaling the image to be scaled comprises:
generating a scaling function based on the motion vector; and
obtaining one or more pixels of a scaled image by applying the scaling function to one or more pixels of the image to be scaled.

3. The method of claim 2, wherein generating the scaling function comprises varying at least one parameter value of the scaling function based on the horizontal component of the motion vector and obtaining one or more pixels of the scaled image comprises obtaining one or more pixels belonging to a row of pixels of the scaled image by applying the scaling function to one or more pixels belonging to a corresponding row of pixels of the image to be scaled.

4. The method of claim 3, wherein generating the scaling function further comprises limiting the at least one parameter value of the scaling function within a substantially pre-defined range of parameter values.

5. The method of claim 2, wherein generating the scaling function comprises varying at least one parameter value of the scaling function based on the vertical component of the motion vector and obtaining one or more pixels of the scaled image comprises obtaining one or more pixels belonging to a column of pixels of the scaled image by applying the scaling function to one or more pixels belonging to a corresponding column of pixels of the image to be scaled.

6. The method of claim 2, wherein generating the scaling function comprises selecting a basis function from the group consisting of a non-linear function and a piecewise linear function, and generating the scaling function using the basis function.

7. The method of claim 2, wherein generating the scaling function comprises selecting a quadratic function and varying a parameter of the quadratic function based on a magnitude value computed from the motion vector.

8. The method of claim 2 further comprises selecting a first predetermined scaling function or the generated scaling function based on a reliability value associated with the motion vector, prior to applying the scaling function to the one or more pixels of the image to be scaled.

9. The method of claim 2 further comprises selecting a second predetermined scaling function or the generated scaling function based on a scene change signal, prior to applying the scaling function to the one or more pixels of the image to be scaled.

10. The method of claim 2, further comprises generating a timing function to control the scaling for different time instants, based on the motion vector, and obtaining one or more pixels of the scaled image comprises applying the scaling function to the one or more pixels of the image to be scaled according to the timing function.

11. The method of claim 10, wherein generating the timing function comprises controlling at least one parameter value of the timing function based on a magnitude value computed from the motion vector.

12. The method of claim 11, wherein generating the timing function further comprises limiting the at least one parameter value of the timing function within a substantially pre-defined range of parameter values.

13. The method of claim 10 further comprises selecting a first pre-determined timing function or the generated timing function based on a reliability value associated with the motion vector prior to applying the scaling function to the one or more pixels of the image to be scaled according to the selected timing function.

14. The method of claim 10 further comprises selecting a second predetermined timing function or the generated timing function based on a scene change signal, prior to applying the scaling function to the one or more pixels of the image to be scaled according to the selected timing function.

15. The method of claim 1, comprising scaling the image to be scaled based on a global motion vector that describes global changes between the first image and the second image.

16. The method of claim 1, wherein the image to be scaled comprises M×N blocks of pixels and wherein scaling of one or more pixels of the image to be scaled comprises:

generating one or more scaling functions based on the respective one or more motion vectors associated with the M×N blocks; and obtaining one or more pixels of the scaled image by applying the one or more scaling functions to one or more pixels of the respective M×N blocks of the image to be scaled.

17. The method of claim 1 in which at least one foreground object is detected by means of its coherent motion or other image characteristics and the scaling takes into account the spatio-temporal position of the at least one foreground object.

18. A device for scaling an image to be scaled belonging to a video sequence of images, comprising:

a first receiver capable of receiving a motion vector that describes the change of position of an object between a first position of the object in a first image and a second position of the object in a second image, said images belonging to the video sequence of images;

a first generator capable of generating a scaling function based on the motion vector; and an image scaler capable of obtaining one or more pixels of a scaled image by applying the scaling function to one or more pixels of the image to be scaled.

19. An image processing apparatus comprising:

a second receiver capable of receiving a video sequence of images;

a motion estimation unit capable of estimating a motion vector that describes the change of position of an object between a first position of the object in the first image and a second position of the object in a second image, said first and second images belonging to the video sequence of images; and a device, as claimed in claim 18, capable of scaling an image belonging to the video sequence of images, wherein the scaling is based on a pre-defined aspect ratio.

20. An image display apparatus comprising:

an image processing apparatus as claimed in claim 19, capable of obtaining the scaled image based on a pre-defined aspect ratio; and a display device capable of displaying the scaled image.

21. The image display apparatus according to claim 20, wherein the display apparatus is selected from a group consisting of a wide screen television, a hand-held device, a mobile phone, a navigation receiver, a picture-in-picture television, a computer display with multiple screens and a media centre.

22. A computer program including a non-transitory computer readable storage medium for processing an image to be scaled belonging to a video sequence of images, comprising:

instructions for generating a scaling function based on a motion vector that describes the change of position of an object between a first position of the object in a first image and a second position of the object in a second image, said images belonging to the video sequence of images; and instructions for obtaining one or more pixels of a scaled image by applying the scaling function to one or more pixels of the image to be scaled belonging to the video sequence of images.

* * * * *